June 23, 1953 J. L. SCHROEDER 2,642,837
ANIMAL FEEDER
Filed March 7, 1951 3 Sheets-Sheet 1

INVENTOR
JOHN L. SCHROEDER

BY
*Young & Wright*

ATTORNEYS

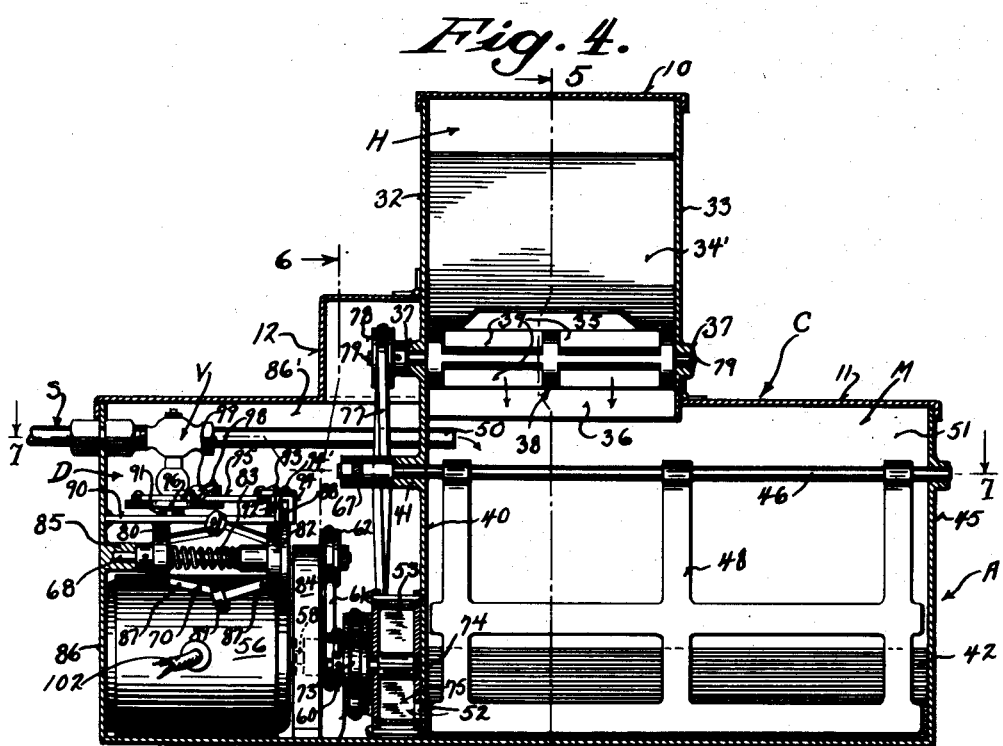
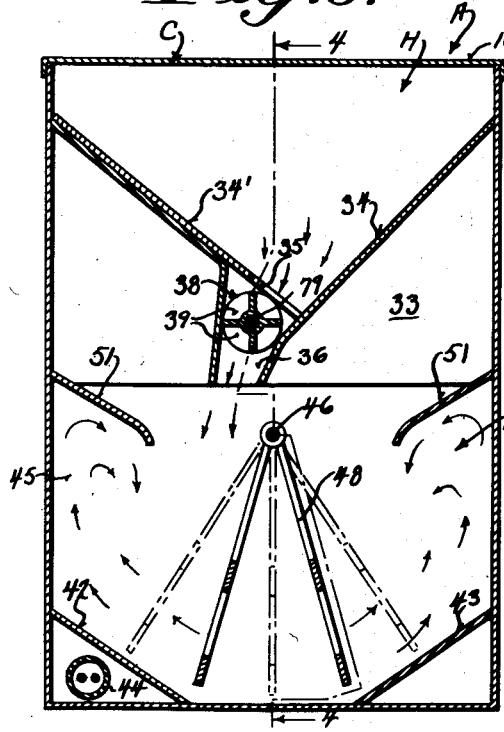
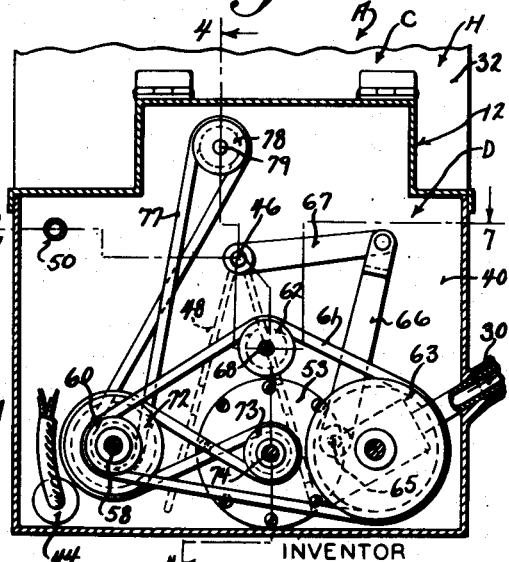

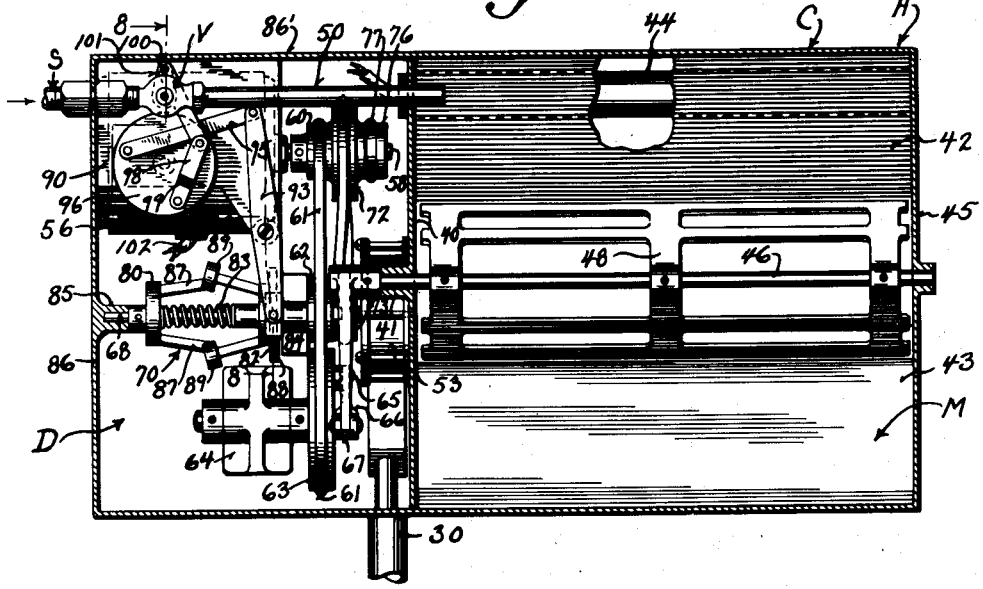

Patented June 23, 1953

2,642,837

UNITED STATES PATENT OFFICE 2,642,837

ANIMAL FEEDER

John L. Schroeder, Watertown, Wis.

Application March 7, 1951, Serial No. 214,253

2 Claims. (Cl. 119—52)

This invention appertains to animal feeders, and more particularly to the type of feeder adapted to automatically replenish the supply of wet mash in a feed trough as required.

A primary object of my invention is to provide novel means for delivering a measured quantity of water and dry feed into an agitating and mixing chamber where the water and feed are mixed to form a wet mash of the desired consistency.

Another important object of my invention is to provide novel means for withdrawing the wet mash from the agitating and mixing chamber and delivering it to the animal feed trough.

A further object of my invention is the provision of a float controlled switch associated with the feed trough and adapted to maintain a predetermined level of wet mash in the trough.

A still further object of my invention is to provide a dry feed storage hopper, with a rotatable measuring valve which is longitudinally chambered to deliver upon rotation a measured quantity of the dry feed into the agitating and mixing chamber.

Another object of my invention is to provide a centrifugal governor responsive to the speed of rotation of the measuring valve, and having a novel linkage to a valve controlling the water supply.

Still another object of my invention resides in the novel arrangement of the motor and its associated drive means, whereby the proper relationship between the operating speeds of all the drive elements is maintained.

A salient feature of my invention is to house the dry feed storage hopper, agitating and mixing chamber, water supply valve, motor and drive means in a compact integral cabinet which may be located at a point remote from the feeding trough.

A more specific object of my invention is to provide the feed trough with a removable partition plate which will act to restrict the active size of the trough when desired.

Still another object of my invention is to provide a simple, practical and reliable construction that is economical to manufacture, easy to assemble and positive in its operation.

With the above and other objects in view, which will more readily appear as the nature of my invention is better understood, the same consists in the novel construction, combination and arrangement of parts hereinafter more fully described, illustrated and claimed. One preferred and practical embodiment of my invention is shown in the accompanying drawings, in which Figure 1 is a perspective view of an apparatus embodying my invention for feeding wet mash to animals and showing both the cabinet and feed trough.

Figure 4 is a longitudinal sectional view in elevation through the cabinet taken on the line 4—4 of Figure 5, looking in the direction of the arrows, and showing the arrangement of the dry feed storage hopper, agitating and mixing chamber, and operating means.

Figure 5 is a transverse section through the dry feed storage hopper and agitating and mixing chamber, taken on the line 5—5 of Figure 4, looking in the direction of the arrows.

Figure 6 is a transverse section taken on the line 6—6 of Figure 4, looking in the direction of the arrows, and illustrating details in the drive means for the rotatable dry feed measuring valve, centrifugal governor, agitating means and certain other elements.

Figure 7 is a top plan view, the section, taken on the line 7—7 of Figure 4, looking in the direction of the arrows and showing further details of the drive means and the agitating and mixing chamber.

Figure 8 is a fragmentary section taken on the line 8—8 of Figure 7, looking in the direction of the arrows, and illustrating in detail the arrangement of the novel linkage for operating the water supply valve.

Figure 1:
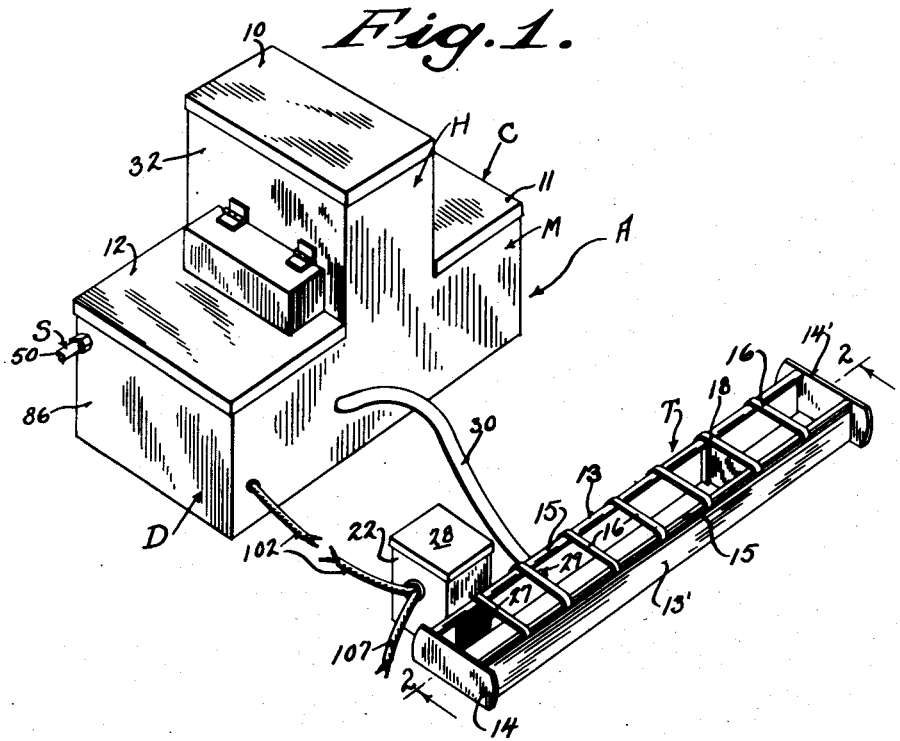

Referring to the drawings in detail, wherein similar reference characters designate corresponding parts throughout the several views, the letter A generally indicates one form of my improved animal feeder, which includes broadly a feed trough T and a cabinet C. The cabinet C forms a compact enclosure for the dry feed hopper H, agitating and mixing chamber M, the water supply S, and includes a compartment D for the motor and various drive elements. In order to have easy access to the various chambers or compartments of the cabinet C such as for the introduction of dry feed or for repair work, the dry feed hopper H is provided with a removable cover 10; the mixing chamber M has a hinged cover 11, and the compartment D has hinged thereto a cover 12.

The elongated trough is provided with the usual sidewalls 13, 13' and end walls 14, 14'. The sidewalls 13, 13' are provided with in-turned flanges 15, better shown in Figure 3, which function to break the hogs of the undesirable habit of uprooting. Extending across the top of the in-turned flanges 15 are a series of spacer bars 16. The spacer bars 16 form separate spaces from which each animal may feed. The trough T may also be provided with a removable partition plate 18 which serves to limit the active portion of the feed trough. It is obvious that the trough T could be so arranged that the removable partition plate 18 could be substituted for any one of the spacer bars 16, as desired.

Figure 2:
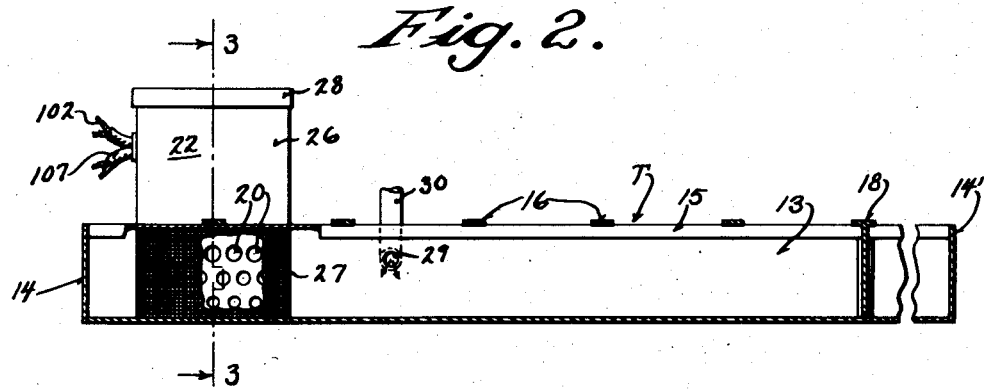
Figure 2 is a longitudinal sectional view through the feed trough taken on the line 2—2 of Figure 1, looking in the direction of the arrows.
Figure 3:
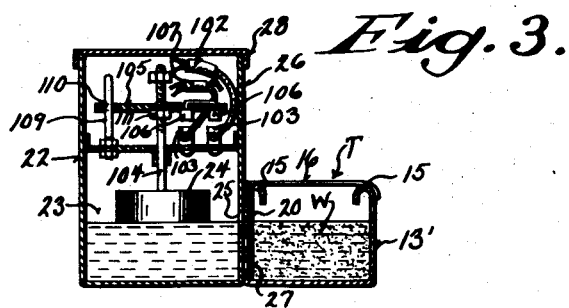
Figure 3 is a transverse sectional view of the feed trough and float control switch taken on the line 3—3 of Figure 2, and looking into the direction of the arrows.

Referring in particular to Figures 2 and 3, it can be seen that one of the sides 13 of the trough T is provided with a series of perforations 20, and secured adjacent thereto is a housing 22 forming a float chamber 23 for a float 24. The float housing 22 includes perforations 25 formed in its forward wall 26 and aligned with the perforations 20 in the feed trough T. A screen 27 is secured to the inner wall 13 and extends over the perforations 20 so that the solid particles in the wet mash W will not enter the float chamber 23. The housing 22 is also provided with a removable cover 28 so that easy access may be had to its interior for adjusting the float. The purpose of the float 24 is to maintain a desired level of wet mash W in the trough, and its operation will be more fully apparent as the description proceeds.

Also formed in the side 13 of the trough T is an aperture 29 to which a flexible conduit 30 is secured. The conduit 30 delivers the supply of wet mash W from the mixing chamber M to the trough T.

Attention is now directed to Figures 4 and 5, and it is to be noted that the dry feed storage hopper H is centrally disposed on the top portion of the cabinet C and includes sidewalls 32, 33 and a sloping bottom 34. The bottom 34 of the hopper H communicates with an elongated feed chute 36 which extends transversely of the hopper H between the sidewalls 32 and 33. In order to vary the size of the opening between the sloping bottom 34 and the feed chute 36, I may provide one side of the bottom with a removable panel 34' having formed therein an opening 35. It is obvious that a number of these panels 34' with various sizes of openings 35 may be provided. Beneath the opening 35 and in the feed chute 36 extending longitudinally therewith is a rotatable measuring valve 38. The measuring valve 38 is supported in suitable bearings 37 and is provided with longitudinal chambers 39 which are so arranged that during rotation of the measuring valve, measured quantities of dry feed will be dumped into the agitating and mixing chamber M as indicated by the arrows.

The agitating and mixing chamber M is separated from the compartment D by wall 40 which is formed as a continuation of the side 32 of the dry feed storage hopper H. The bottom of the agitating and mixing chamber M is sloped slightly, and this is accomplished by the provision of a pair of longitudinally extending corner plates 42, 43. Beneath one of the corner plates 42 is a heating element 44 which may be utilized to raise the wet mash to any desired temperature. Journalled in the wall 40 at 41 and extending to the opposite wall 45 is a rod or bar 46 upon which is rigidly mounted an A-shaped agitating and mixing arm 48. Extending through an aperture formed in the wall 40 just below the feed chute 36 is a water supply pipe 50 which is adapted to supply water from a source of supply S, through the valve V and into the agitating and mixing chamber M.

It should be obvious from the description thus far, that upon rotation of the measuring valve 38 dry feed or grain is delivered into the agitating and mixing chamber M, and that water may be delivered to the chamber from the supply pipe 50. The agitating and mixing arm 48 is adapted to reciprocate from the full line position to the dotted line positions as clearly shown in Figure 5, so that the dry grain and water may be thoroughly mixed and agitated as indicated by the arrows. The upper portion of the mixing chamber M is provided with downwardly extending flanged splash plates 51 extending longitudinally and approximately parallel with the corner plates 42, 43. The purpose of these flanged splash plates 51 is to conduct the agitated wet mash downwardly and back into the mixing chamber M. Adjacent the lower end of the wall 40 is an opening 52 leading into the bottom portion of a rotary pump 53. The rotary pump 53 has an elongated discharge nozzle 54 to which is connected one end of the conduit 30 (Figures 6 and 7). The pump 53 is adapted to be actuated upon rotation of the dry feed measuring valve 38 and reciprocation of the agitating and mixing arm 48, so that the wet mash may be pumped through the conduit 30 and into the trough T.

As is readily apparent by referring to either Figures 4, 6 or 7, the compartment D houses the rotary pump 53 and the drive elements for rotating the pump, the measuring valve 38, for reciprocating the agitating and mixing arm 48 and operating the water supply valve V. While I have shown an electric motor 56 providing the means for actuating all of the drive elements, it is obvious that any suitable source of power may be substituted therefor. The shaft 58 of the motor 56 carries three pulley wheels 60, 72 and 76, splined thereto.

Referring in particular to Figure 6, it can be seen that the inner motor pulley 60 is in drive connection with a pulley belt 61 which extends around a pulley 62 and a larger pulley 63. The larger pulley 63 is rotatably mounted in and supported by a bracket 64. This pulley 63 has formed on its inner face an eccentrically mounted lug 65 to which is pivotally secured crank arms 66 and 67. The arm 67 is splined to the bar 46 upon which the agitating and mixing arm 48 is mounted. Rotation of pulley 63 will impart, through crank arms 66 and 67, the reciprocating motion to arm 48 as shown in Figure 5. The smaller pulley 62 is splined to a rotatable shaft 68 upon which is mounted the centrifugal governing device 70, the purpose of which will be hereinafter more fully described.

The intermediate motor pulley 72 is made larger than the inner or outer pulleys 60, 76, and is in belt drive with a smaller pulley 73 to which is splined the central shaft 74 for rotating the pump blades 75. The central shaft 74, therefore, is rotated at a faster rate than the motor shaft 58.

The outer motor pulley 76 is connected by means of a pulley belt 77 to a pulley 78, which is in turn splined to the shaft 79 of the rotatable measuring valve 38. The arrangement of the speed of rotation of the various pulleys forms an important feature of my invention and is such that the inner motor pulley 60, outer motor pulley 76 and pulley 78 all rotate at approximately the same speed. Pulley 73 rotates faster and pulley 63 slower in relation thereto. The reason for this arrangement will be more clearly understood when the operation of the apparatus is more fully described.

Referring now to my novel means for operating the water supply valve V, attention is directed to Figures 7 and 8; and it should be understood that the opening and closing of the valve V to supply water to the pipe 50 is accomplished by movement of the centrifugal governor 70. One end 80 of the centrifugal governor 70 is splined to the shaft 68 which is rotated by pulley 62. The other end 82 of the governor is slidably mounted on the shaft 68 and urged by means of spring 83 against an abutment 84. As is usual with centrifugal governors of this type, the end portions 80 and 82, respectively, are pivotally connected by means of arms 87 to weights 89, which are responsive to the centrifugal force resulting from rotation of shaft 68. The shaft 68 is rotatably supported in the abutment 84 and extends therethrough into an end bearing 85, formed in the wall 86 of the cabinet C. Secured to the end portion 82 of the governor 70 and rotatable therewith is a disc 88.

Referring now in particular to Figures 7 and 8, it can be seen that the linkage from the disc 88 to the water supply valve V is operatively supported on a substantially rectangular bracket plate 90. The bracket plate 90 is welded or otherwise secured to the walls 86 and 86' of the cabinet C, and is provided with upwardly projecting spindles 91 and 92. Pivoted to the spindle 92 intermediate its length is an arm 93. The outer end of the arm 93 is provided with a pivoted guide 94 having a longitudinal slot 94' loosely receiving the rotatable disc 88. The inner end of the arm 93 is pivotally secured to a bar 95. The other extremity of the bar 95 is eccentrically mounted and pivoted to a table 96 which, in turn, is rotatably supported on the spindle 91. If desired, the table 96 may be provided with ball bearing supports 97. Also eccentrically pivoted to the table 96, near the outer periphery thereof, is an arm 98 which is formed with an upwardly extending portion 99. The portion 99 is of sufficient height to extend above the level of arm 93 and bar 95. Pivoted to the other end of this arm 98 is an arm 100 which in turn is secured to the outer end of the operating lever 101 for the water supply valve V. The linkage with the table 96 is such that the very slight sliding movement of the disc 88 will be magnified and converted into rotary movement for positive opening of the valve V; thereby allowing water from the supply S to enter the pipe 50 and mixing chamber M.

Electrical energy is conducted to the motor 56 by means of a wire 102 which extends from the motor into the float housing 22, as clearly shown in Figure 1. Referring now to Figure 3, it is apparent that the wire 102 has fastened thereto contact points 103 and that the float 24 has secured thereto an upright guide shaft 104 which has, extending transversely therefrom, an insulated contact carrying plate 105. The contacts 106 mounted upon the plate 105 are fastened to a wire 107 which extends from the float housing 22 to a suitable source of electrical power (not shown). The guide shaft 104 of the float 24 is slidably mounted centrally of the float chamber 23 in a rigidly secured supporting plate 108 carrying the contacts 103. If desired, supporting plate 108 may be provided with an additional fixed guide rod 109 which may be slidably received in an aperture 110 in the movable insulated plate 105. The height of the plate 105, with relation to the float 24 and contacts 103, may be adjusted by means of a threaded supporting nut 111.

Thus it is evident that the height of the wet mash W in the trough T may be adjusted to any desired level by turning the nut 111 and adjusting the point at which the contacts 103 and 106 will meet. For example, should the wet mash W drop below this desired level, the float 24 will be lowered and contacts 103 and 106 closed. This will immediately close the circuit to the electric motor 56 which will then start and cause rotation of the pulleys 60, 72 and 76. Through the various belt drives described above, the measuring valve 38 will be rotated to deliver dry feed into the agitating and mixing chamber M, the agitating and mixing arm 48 will be reciprocated, the wet mash supply pump 53 started and the water valve V opened. Thus a fresh supply of wet mash will be delivered through the conduit 30 into the feed trough T, and at the same time the supply of wet mash in the chamber M will be replenished. As the level of the wet mash W rises the liquid in the float chamber 23 will lift the float 24 causing contacts 103 and 106 to separate. This will break contact between the motor 56 and the source of electrical power which will cause the motor to stop.

As stated above, a very important feature of this invention resides in the novel relationship between the rotation of the measuring valve 38 and the opening of the water valve V (through the centrifugal governor 70 and drive means) which allows the opening of the water valve V to lag slightly behind the initial rotation of the dry feed measuring valve 38. This will always assure the delivery of a measured quantity of dry grain or feed into the agitating and mixing chamber prior to the delivery of the water, and this relationship has been carefully worked out so that the proper proportion of dry feed and water is always present. The reason for this relationship and the slight lag in the opening of the water valve V is due to the fact that the speed of rotation of the measuring valve shaft 79 and the centrifugal governor shaft 68 is approximately the same. Thus, when the electric motor 56 starts the measuring valve 38 splined to shaft 79 will immediately rotate, delivering measured quantities of dry feed; shaft 68 will also be immediately rotated; however the centrifugal governor 70 will not move the slidable disc 88 until the speed of shaft 68 is sufficient to move the weights 89.

My animal feeding apparatus is also readily adapted to be utilized with the preparation of cultured feed for hogs and the like, wherein a desired amount of culturing agent such as one containing yeast may be added and the mixture cultured and supplied in a creamlike consistency. Cultured feed, in particular, must be agitated at times to prevent the uneven fermentation of the wet mash, and the agitating and mixing arm 48 is ideal for performing this function. With my apparatus the animals can feed whenever they want to and without manual attention except the replenishing of dry feed in the hopper H. As the animals feed and the level of the wet mash W recedes, the float actuated switch will make contact with the source of power and the electric motor will be started to immediately deliver a new supply of water and dry feed to the chamber M, from which the wet mash will be pumped to the trough T.

My compact cabinet C may be placed in any convenient location remote from the trough T;

such as in a barn with the trough positioned outside in the yard or animal pen. This gives the advantage of being able to store the mixture at one point where it can be agitated, and then dispensing the mixture to the feed trough only as and when the animals require it. This insures always a fresh supply of well agitated mixture to the feed trough to meet the demands of the animals.

From the foregoing, it is believed that the features and advantages of my invention will be readily apparent to those skilled in the art, and it will of course be understood that changes in the form, proportion and minor details of construction may be resorted to without departing from the spirit of the invention or the scope of the appended claims.

I claim:

1. A dispensing apparatus of the type for automatically feeding wet mash to animal feed troughs in response to the demands of the feeding animals including, a cabinet located remote from the feed trough, an elevated centrally disposed hopper in said cabinet, an agitating and mixing chamber below said hopper and communicating therewith, a rotatable measuring valve closing off communication between the hopper and the mixing chamber, a pump in said cabinet adjacent said mixing chamber having an inlet communicating with the chamber and an outlet opening out on the exterior of the chamber, an agitating and mixing arm rockably mounted in said mixing chamber and extending longitudinally thereof, a water supply pipe extending into said agitating and mixing chamber, a valve controlling the supply of water to the pipe, an electric motor, and drive means including a series of belt driven pulleys operatively connecting the motor with the rotatable measuring valve, water supply valve, pump and agitating and mixing arm.

2. A dispensing apparatus of the type for automatically supplying a measured quantity of wet mash to an animal feed trough in response to the demands of the feeding animals including, a cabinet having a grain storage hopper and an agitating and mixing chamber therein, said grain storage hopper being disposed centrally of said cabinet above said agitating and mixing chamber and having a bottom opening communicating therewith, a rotatable measuring valve in said opening adapted upon rotation to deliver measured quantities of dry feed to the agitating and mixing chamber, a water supply pipe mounted below the hopper opening and adjacent the top of the mixing chamber, a valve in said water supply pipe controlling the delivery of water to the pipe and chamber, an agitating and mixing arm mounted in said agitating and mixing chamber for reciprocating movement therein, a pump adjacent the bottom of the agitating and mixing chamber having its inlet communicating with the chamber and its outlet communicating with the feed trough, means including a motor and drive elements for simultaneously actuating the rotatable measuring valve, the pump, and the agitating and mixing arm; and means responsive to the actuation of the rotatable measuring valve for opening the water supply valve, whereby measured quantities of water and dry grain are delivered to the agitating and mixing chamber.

JOHN L. SCHROEDER.

References Cited in the file of this patent

UNITED STATES PATENTS

| Number | Name | Date |
|---|---|---|
| 1,207,938 | Kuxmann | Dec. 12, 1916 |
| 1,458,058 | Hoppes | June 5, 1923 |
| 1,624,245 | Holmes et al. | Apr. 12, 1927 |
| 2,555,437 | Edwards | June 5, 1951 |
| 2,563,331 | Hager | Aug. 7, 1951 |